ABSTRACT OF THE DISCLOSURE

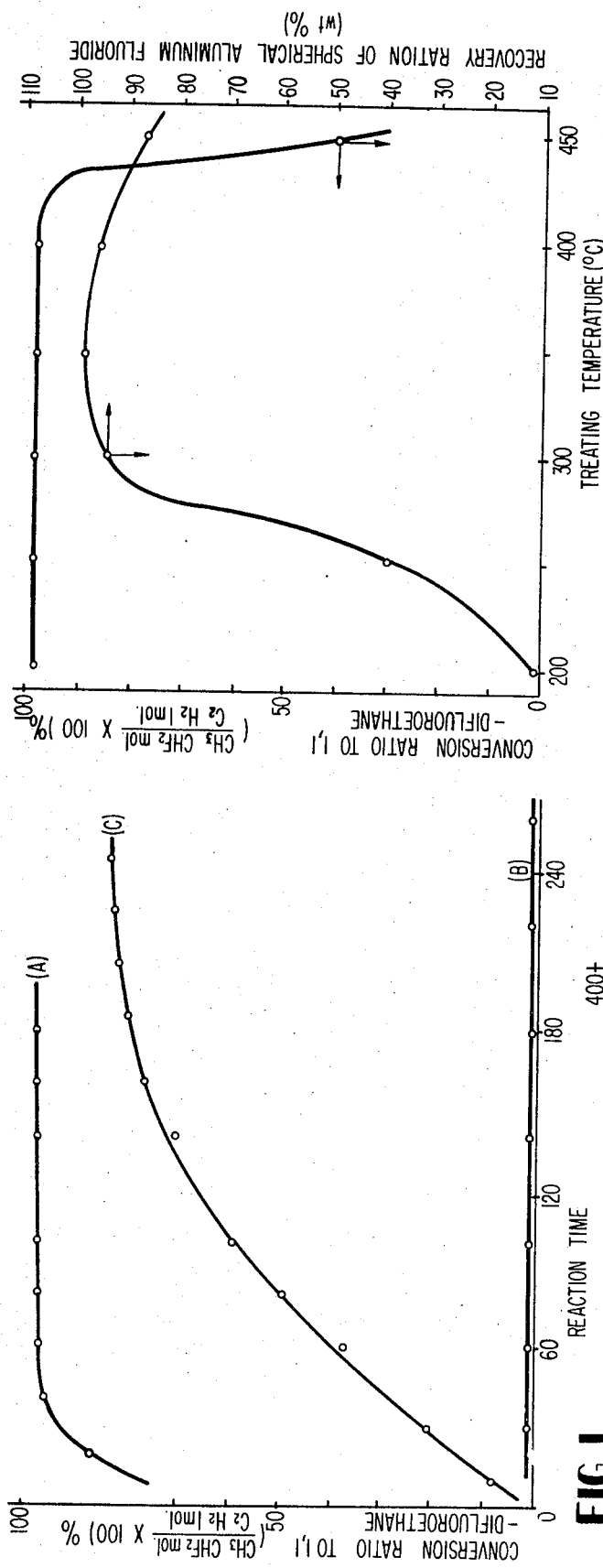
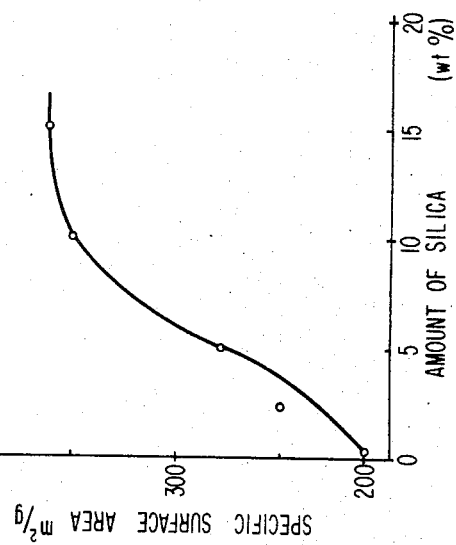
FIG. 1
FIG. 2
FIG. 3
INVENTORS
KIYONORI SHINODA
TADAYOSHI WATANABE
SHIGERU MIZUSAWA
BY Sughrue, Rothwell, Mion, Zinn & Macpeak
ATTORNEYS 3,697,443
ALUMINUM FLUORIDE FLUORINATION
CATALYST
Kiyonori Shinoda, Tadayoshi Watanabe, and Shigeru
Mizusawa, Fukushima, Japan, assignors to Kureha
Kagaku Kogy Kabushiki Kaisha, Chuo-ku, Tokyo,
Japan
Filed Aug. 12, 1969, Ser. No. 849,472
Claims priority, application Japan, Aug. 14, 1968,
43/57,888
Int. Cl. B01j 11/78
U.S. Cl. 252—442                     1 Claim

A catalyst having higher activity in fluorination of acetylene and other hydrocarbons is obtained by treating an acidic active alumina containing 2 to 20% by weight of silica with hydrogen fluoride at a temperature of 200 to 430° C.

BACKGROUND OF THE INVENTION

Field of the invention

The present invention relates to a process for preparing a novel fluorination catalyst, more particularly, the present invention relates to a process for preparing a catalyst for hydro-fluorination of acetylenic hydrocarbons.

DESCRIPTION OF THE INVENTION

As a catalyst for hydro-fluorination of acetylene in the gaseous phase, many catalysts have been known including a mercury system, aluminum fluoride, chromium oxide, etc. In particular, aluminum fluoride has been known as a catalyst for simultaneously obtaining vinyl fluoride and 1,1-difluoroethane in a hydro-fluorination reaction. The aluminum floride has been prepared by reacting aluminum nitrate, anhydrous aluminum chloride or active alumina with hydrogen fluoride. For example, aluminum fluoride catalyst described in U.S. Patent No. 2,471,525 corresponds to this. In addition, as other materials having a different crystal form can be found $\alpha$-aluminum fluoride, $\beta$-aluminum fluoride and $\beta,\gamma,\delta$-aluminum fluoride obtained by heat-treating an aluminum fluoride hydrate described in the specification of Japanese patent publication No. 2252/1967, under conditions of various temperatures, or by reacting hydrogen fluoride with an active alumina in the gaseous phase, and $\epsilon$-aluminum fluoride obtained by heat-treating an aluminum fluoride obtained by evaporating the solution part to dryness, which is obtained by removing the precipitate from the hydrogen fluoride solution described in the specification of Japanese patent publication No. 9727/1968. However, these aluminum fluorides have complicated preparation methods and, in addition, are not sufficiently active. On the contrary, the aluminum fluoride catalyst according to the present invention can be very easily prepared, and is also extraordinarily high in activity.

SUMMARY OF THE INVENTION

An object of the present invention is to provide an extremely high active porous catalyst for fluorination by treating an acidic active alumina particle containing 2 to 20% by weight of silica therein under temperature conditions of from 200 to 430 C. Preferably, if the treating temperature is limited to from 250 to 400° C., a fluorination catalyst having an even higher strength can be obtained. The present inventors have found that the aluminum fluoride particle so obtained is a fluorination catalyst which is lower in filling density, more excellent in mechanical strength and higher in activity in the fluorination reaction of acetylene in comparison with well-known aluminum fluoride and aluminum fluoride prepared from active alumina.

BRIEF DESCRIPTION OF THE DRAWINGS

FIG. 1 shows a comparison of catalyst activity in catalysts prepared from an active alumina in cases where the alumina contains silica and wherein the alumina does not contain silica.

FIG. 2 shows the relationships between temperature and catalyst activity, and between temperature and mechanical strength in the case of fluorinating an active alumina.

FIG. 3 shows the relationship between the silica content in the alumina and the specific surface area of the catalyst of the present invention.

DETAILED DESCRIPTION OF THE INVENTION

The present invention is characterized by treating a porous granular active alumina with gaseous hydrogen fluoride, which is obtained by incorporating from 2 to 20% by weight of silica in the alumina, to remove the silica in the alumina as silicon tetrafluoride, to thereby obtain a more porous and highly active aluminum fluoride. In obtaining the highly active aluminum fluoride catalyst of the present invention, not only the selection of the raw material (alumina), but also the selection of the treating conditions with the gaseous hydrogen fluoride are essential. When silica is added to the alumina, the crystallization of the intermediate alumina is prevented and, as the result, the specific surface area of the alumina is increased and the activity and heat resistance of the alumina itself are elevated. A silica-alumina catalyst containing more than 20% of silica is difficult to obtain as a particle which is high in mechanical strength since it tends to break down into powder by hydrogen fluoride treatment, and therefore such a catalyst is not desirable. Alternatively, a silica-alumina catalyst containing less than 2% of silica is not preferable, since, when treating with hydrogen fluoride, the specific surface area is lowered and the activity of the resulting catalyst is lowered.

A granular active alumina containing silica is obtained, for example, by granulating an alumina gel containing silica in the state of a hydrogel, drying as it is, and calcining it. In such a way, a spherical active alumina which is high in particle strength, abrasion resistance, and heat resistance, and is large in pore diameter and pore efficiency is obtained. In the case of treating an active alumina containing silica with hydrogen fluoride gas, the gas may be diluted with, for example, oxygen, nitrogen, carbon dioxide, argon, and other inert gases although the hydrogen fluoride gas may be used alone; although, when the alumina is reacted with hydrogen fluoride to produce aluminum fluoride, steam is by-produced, and the steam can be rapidly removed from the reaction system if there is a flow of diluting gas, and thus the presence of diluting gas is preferable.

The silica-containing active alumina catalyst is usually acidic; however, in carrying out the fluorine treatment according to the present invention, it is necessary that the treatment be acidic. An active catalyst cannot be obtained with the active alumina being neutralized by an alkali treatment.

The preferable amount of hydrogen fluoride is from about 5 to about 15 moles per 1 mole of raw material alumina. For example, the reaction may be discontinued in such a respect that when 1 mole of alumina is treated with a flowing gaseous mixture of 1 to 2.5 moles/hour of hydrogen fluoride and 0.25 to 0.6 mole/hour of nitrogen for 5 to 7 hours, the unreacted hydrogen fluoride is discharged from the reaction system, or the discharge of water is stopped. The amount of hydrogen fluoride for the alumina is not critical, however, since when the treating amount is less than the described one, the reaction activity of the obtained catalyst is still high; however, such a catalyst is not preferable, since, for example, when it is used for the hydro-fluorination reaction of acetylene, tarry by-products are produced. An excess of treating amount is also not preferable since it results in the loss of hydrogen fluoride.

The temperature to be used for treating an active alumina may be in the range of from 200 to 430° C. Even when the treating temperature is 200° C., the catalyst obtained according to the present invention has a very high activity in comparison with one prepared by fluorinating an alumina which does not contain silica. However, even in the above temperature range, the particle strength is remarkably influenced by the treating temperature, and thus a temperature of 250 to 400° C. is particularly desirable.

While the catalyst activity is very high at a temperature of from 200 to 400° C., the rate of aluminum fluoride recovered, in spherical form, is remarkably reduced at a temperature below 250° C. Pieces of aluminum fluoride broken at a lower temperature still have an appreciably large particle size (for example, most of the particles treated at 200° C. are 12–14 mesh), and are difficult to powder; however, the particles of aluminum fluoride obtained at a temperature above 400° C. are very brittle and are easily pulverized.

That the aluminum fluoride obtained by treating an active silica-containing alumina at a temperature of from 200 to 430° C. has an extraordinarily high activity is thought to be due to the fact that, inter alia, the specific surface area of BET by nitrogen absorption of active alumina containing 10% of silica is 350 m.$^2$/g. which is larger in comparison with the specific surface area of 210 m.$^2$/g. in active alumina not containing silica, and, when treating an alumina having such a large specific surface area with hydrogen fluoride, the aluminum fluoride so obtained is larger in specific surface area than the conventional aluminum fluoride. Also, when using an active silica-containing alumina, a more porous aluminum fluoride is obtained because the silica in the alumina is easily reacted with the hydrogen fluoride to release, as $SiF_4$ and acetylene, hydrogen fluoride and other gases which can be easily absorbed in the pores formed by release of $SiO_2$.

In order to further illustrate the advantages of the catalyst of the present invention, comparative results are shown in FIG. 1, comparing the catalysts of the present invention obtained as shown in the examples in comparison with the catalyst obtained according to the comparative examples.

Catalyst (C), in Comparative Example 1, is a catalyst obtained by fluorinating an active alumina which does not contain silica therein, and catalyst (B), in Comparative Example 2, is a catalyst obtained by fluorinating an active alumina which contains silica whose acidity has been neutralized with alkali.

An active alumina containing 10% by weight of silica, one prepared by neutralizing the active alumina containing 10% by weight of silica with NaOH (the akali is contained as $Na_2O$ in the alumina), and an active alumina, i.e., single alumina, were treated with a flowing gaseous mixture of gaseous hydrogen fluoride and nitrogen, controlled so as to contain 6 to 12 moles of hydrogen fluoride per 1 mole of alumina at a temperature of 330° C. for 6 hours to obtain aluminum fluoride catalysts (A), (B), and (C), respectively. An analysis revealed that all of these active alumina catalysts were fluorinated to a degree of about 90%.

The reaction conditions are as described in the examples and Comparative Examples 1 and 2.

The conversion ratio to 1,1-difluoroethane, as described in FIGS. 1 and 2, was determined as follows:

Conversion ratio to 1,1-difluoroethane $$= \frac{\text{moles of raw material gas converted to 1,1-difluoroethane}}{\text{moles of feed raw material gas}} \times 100$$

The space velocity is/was determined thereby:

$$\text{Space Velocity} = \frac{\text{Volume, under standard conditions, of the reacting material passing through the catalyst layer per unit time}}{\text{volume of catalyst layer}}$$

The recovery ratio of spherical aluminum fluoride described in FIG. 2 is determined as follows:

Recovery ratio of spherical aluminum fluoride $$= \frac{\text{Weight of aluminum fluoride recovered in spherical form}}{\text{weight of total aluminum fluoride}} \times 100$$

As a result, as is clearly shown in FIG. 1, the aluminum fluoride catalyst (A) prepared from an active alumina containing silica (not neutralized) is shown to be far higher in activity than the catalysts (B) and (C) prepared from other active alumina. When catalyst (A), prepared according to the present invention, is used in the hydrofluorination reaction of acetylene, 1,1-difluoroethane is selectively obtained at a conversion rate of 98 mole percent. Thus, catalyst (A) is extremely higher in performance than the conventional solid catalyst and, thus, is an industrially valuable catalyst by which 1,1-difluoroethane can be obtained in the gaseous phase. The porous aluminum fluoride catalyst of the present invention can be advantageously used not only in the hydrofluorination of acetylene but also in the hydrofluorination reaction of aliphatic hydrocarbons having from 1 to 4 carbon atoms, which are partially or completely halogenated by a halogen other than iodine, and have at least one halogen atom other than fluorine, and also can be applied to derivatives of these hydrocarbons, for example, ketones, cyans, etc.

The present invention will be further illustrated by the following examples and comparative examples:

EXAMPLE I (a) Catalyst: a catalyst was prepared by filling up the central zone of nickel reaction tube of 15.7 mm. in inner diameter and 1000 mm. in length with 80 cc. (48 g.) of spherical active alumina of 6 to 8 mesh containing 10% by weight, of silica, heating it in an electric furnace at 330° C., fluorinating the active alumina with a flowing gaseous mixture of nitrogen at 0.3 mole/hour and hydrogen fluoride at 1.2 mole/hour while controlling the temperature and gas flowing velocity, purging with nitrogen to remove the remaining hydrogen fluoride, and taking out and sieving the catalyst.

(b) Reaction: 65 cc. (58 g.) of the aluminum fluoride catalyst prepared under the above conditions filled up a nickel reaction tube of 15.7 mm. in inner diameter and 1000 mm. in tube length, and a gaseous mixture of hydrogen fluoride and acetylene in a proportion of 2.5 moles of hydrogen fluoride per 1 mole of acetylene was passed through the reaction tube at a space velocity of 226 volume/volume/hour while heating the reaction tube by a controlled electric furnace at 230° C., and then, the gas flowing out from the reaction tube was washed with alkali and water respectively, and, after measuring by a gas meter, was analyzed by a gas chromatography. As the result, the gas composition after 3 hours was 0.22 mole percent of ethylene, 2.25 mole percent of vinyl fluoride and 97.53 mole percent of 1,1-difluoroethane, and the conversion rate of acetylene was 100 mole percent. The results, at various times, are shown by curve (A) of FIG. 1.

Comparative Example 1

(a) Catalyst: A catalyst was prepared by filling up a nickel reaction tube of 15.7 mm. in inner diameter and 1000 mm. in tube length with 80 cc. (72.5 g.) of 6 to 8 mesh active alumina comprising only alumina, and then the active alumina was fluorinated with a flowing gaseous mixture of 0.3 mole/hour of nitrogen and 1.2 mole/hour of hydrogen fluoride for 9 hours while heating the reaction tube by a controlled electric furnace at 330° C., and, thereafter, purging with nitrogen for 1 hour to remove the remaining hydrogen fluoride and taking out and sieving the catalyst.

(b) Reaction: 65 cc. (87 g.) of the aluminum fluoride catalyst prepared under the above conditions filled up a nickel reaction tube of 15.7 mm. in inner diameter and 1000 mm. in tube length, and a gaseous mixture of hydrogen fluoride and acetylene in the proportion of 2.5 moles of hydrogen fluoride per 1 mole of acetylene was passed through the reaction tube at a space velocity of 226 volume/volume/hour while heating the reaction tube by a controlled electric furnace at 230° C., and then, the gas flowing out from the reaction tube was washed with alkali and water respectively, and, after measuring by a gas meter, was analyzed by gas chromatography. As a result, the gas composition after 3 hours was 0.28 mole percent of ethylene, 16.10 mole percent of unreacted acetylene, 4.65 mole percent of vinyl fluoride and 79.07 mole percent of 1,1-difluoroethane. The results at various times are shown by curve (C) of FIG. 1.

Comparative Example 2

(a) Catalyst: A catalyst was prepared by filling up the central zone of a nickel reaction tube of 15.7 mm. in inner diameter and 1000 mm. in tube length with 80 cc. (47 g.) of 6 to 8 mesh active alumina containing 8%, by weight, of silica and 2% by weight of $Na_2O$, the acidity of which was neutralized, and fluorinating the active alumina with a flowing gaseous mixture of 0.3 mole/hour of nitrogen and 1.2 mole/hour of hydrogen fluoride for 6 hours, while heating the reaction tube by a controlled electric furnace at 330° C., and then purging with nitrogen for 1 hour to remove the remaining hydrogen fluoride, and taking out and sieving the catalyst. This catalyst was very pulverizable.

(b) Reaction: 65 cc. (58 g.) of the aluminum fluoride catalyst prepared as above filled up a nickel reaction tube of 15.7 mm. in inner diameter and 1000 mm. in tube length, and a gaseous mixture of hydrogen fluoride and acetylene in the proportion of 2.5 moles of hydrogen fluoride per 1 mole of acetylene was passed through the reaction tube at the space velocity of 226 volume/volume/hour while heating the reaction tube by a controlled electric furnace at 230° C., and then the gas flowing out from the reaction tube was washed with alkali and water respectively, and, after measuring by a gas meter, was analyzed by gas chromatography. As a result, the gas composition after 3 hours was 97 mole percent of unreacted acetylene, 1 mole percent of vinyl fluoride, and 2 mole percent of 1,1-difluoroethane. The results at various times are shown by curve (B) of FIG. 1.

EXAMPLE 2

In order to determine an appropriate fluorination temperature, a catalyst was prepared by filling up the central zone of a nickel reaction tube of 15.7 mm. in inner diameter and 1000 mm. in tube length with 80 cc. (48 g.) of 6 to 8 mesh active alumina containing 10% of silica and fluorinating the active alumina with a flowing gaseous mixture of 0.3 mole/hour of nitrogen and 1.2 mole/hour of hydrogen fluoride for 6 hours, while heating the reaction tube by a controlled electric furnace at 200° C., and then purging with nitrogen for 1 hour to remove the remaining HF and take out the catalyst. The same operation was carried out at 250° C., 350° C., 400° C., and 450° C. 65 cc. of aluminum fluoride prepared at each temperature filled up the central zone of nickel reaction tube of 15.7 mm. in inner diameter and 1000 mm. in tube length, and a gaseous mixture of hydrogen fluoride and acetylene in the proportion of 2.5 moles of hydrogen fluoride per 1 mole of acetylene was passed through the reaction tube at the space velocity of 226 volume/volume/hour, and then the gas flowing out from the reaction tube was washed with alkali and water respectively, and, after measuring by a gas meter, was analyzed by gas chromatography. The results at each temperature are shown in FIG. 2.

EXAMPLE 3

65 cc. (58 g.) of the catalyst prepared in Example 1 was placed in the central zone of a nickel reaction tube of 15.7 mm. in inner diameter and 1000 mm. in tube length, and a gaseous mixture of hydrogen fluoride and vinyl fluoride in the proportion of 2.0 moles of hydrogen fluoride per 1 mole of vinyl fluoride was passed through the reaction tube at the space velocity of 300 volume/volume/hour, and then the reaction gas was washed with alkali and water, respectively, and, after measuring by a gas meter, was analyzed by gas chromatography. As a result, the gas composition was 0.1 mole percent of ethylene, 99.1 mole percent of 1,1-difluoroethane, and 0.8 mole percent of unreacted vinyl fluoride.

EXAMPLE 4

Catalysts were prepared by fluorinating spherical active alumina having different contents of silica in the same manner as in Example 1. The specific surface area of these prepared catalysts were determined by measuring the amount of absorbed nitrogen using BET apparatus. The results are shown in FIG. 3.

What is claimed is:

1. A catalyst for fluorination of hydrocarbons consisting essentially of porous aluminum fluoride, said catalyst being prepared by treating an acid active alumina particle containing 2 to 20% by weight of silica and prepared from a hydrogel with gaseous hydrogen fluoride at a temperature of from 250–400° C. whereby the alumina is converted to a degree of at least about 90% aluminum fluoride and said silica being substantially completely removed as gaseous silicon fluoride, said hydrogen fluoride used during said catalyst preparation in an amount of from about 5 moles to about 15 moles per mole of alumina.

References Cited

UNITED STATES PATENTS

| 2,506,923 | 5/1950 | Hoekstra | 252—442 X |
| 3,395,187 | 7/1968 | Christoph Jr. | 260—653.4 |
| 3,413,360 | 11/1968 | Gardner | 252—442 X |
| 3,418,314 | 12/1968 | Schwarz et al. | 252—442 X |
| 3,432,441 | 3/1969 | Gardner | 252—442 X |

DANIEL E. WYMAN, Primary Examiner

P. E. KONOPKA, Assistant Examiner

U.S. Cl. X.R.

260—653.4, 653.6